US012343234B2

(12) United States Patent
Ortega Trucios et al.

(10) Patent No.: US 12,343,234 B2
(45) Date of Patent: Jul. 1, 2025

(54) DENTAL ANCHORING SYSTEM FOR FASTENING PROSTHESES

(71) Applicant: CREATECH MEDICAL, S.L., Mendaro (ES)

(72) Inventors: Arkaitz Ortega Trucios, Mendaro (ES); Julen Gimeno Eguia, Mendaro (ES); Mikel Gómez Picaza, Mendaro (ES); Rubén Urzainki Beristain, Mendaro (ES); Antxoka Urzainki Beristain, Mendaro (ES)

(73) Assignee: CREATECH MEDICAL, S.L., Mendaro (ES)

( * ) Notice: Subject to any disclaimer, the term of this patent is extended or adjusted under 35 U.S.C. 154(b) by 0 days.

(21) Appl. No.: 18/628,023

(22) Filed: Apr. 5, 2024

(65) Prior Publication Data

US 2024/0252288 A1    Aug. 1, 2024

Related U.S. Application Data

(62) Division of application No. 16/969,721, filed as application No. PCT/EP2019/053527 on Feb. 13, 2019, now Pat. No. 11,986,373.

(30) Foreign Application Priority Data

Feb. 13, 2018   (ES) ............................... ES201830128

(51) Int. Cl.
*A61C 8/00*  (2006.01)
*A61C 13/225*  (2006.01)
*A61C 13/265*  (2006.01)

(52) U.S. Cl.
CPC .......... *A61C 8/0057* (2013.01); *A61C 13/225* (2013.01); *A61C 13/2656* (2013.01)

(58) Field of Classification Search
CPC ... A61C 8/0048; A61C 8/0057; A61C 8/0062; A61C 8/0086; A61C 13/225; A61C 13/2255; A61C 13/2656
See application file for complete search history.

(56) References Cited

U.S. PATENT DOCUMENTS 5,417,570 A    5/1995   Zuest et al.
6,299,447 B1  10/2001   Zuest et al.
(Continued)

FOREIGN PATENT DOCUMENTS

EP      2664297 A1       11/2013
WO   2010/025034 A1       3/2010
(Continued)

OTHER PUBLICATIONS

May 27, 2019 International Search Report issued in International Patent Application No. PCT/EP2019/053527.
(Continued)

*Primary Examiner* — Edward Moran
(74) *Attorney, Agent, or Firm* — Oliff PLC

(57) ABSTRACT

A dental anchoring system for fastening prostheses having a male component, a female component which is coupled to the male component, and a connection element which is coupled to the female component and makes up the retaining element of the prosthesis configured to be joined to the connection element. The dental anchoring system is configured to achieve a self-adjustable fastening of the prosthesis which enables the mobility of prosthesis to be controlled when it is subjected to a load during the use thereof by a patient; and wherein the mobility is limited by a ring-shaped stop of the female component, when at least one portion of a ring-shaped plane of the connection element comes into contact with ring-shaped stop of the female component.

1 Claim, 6 Drawing Sheets

(56) References Cited

U.S. PATENT DOCUMENTS

| | | |
|---|---|---|
| 6,981,871 B2 | 1/2006 | Mullaly et al. |
| 9,033,709 B1 | 5/2015 | Allen et al. |
| 9,314,318 B2 | 4/2016 | Mullaly et al. |
| 9,456,881 B1 | 10/2016 | Niznick |
| 2015/0140512 A1 | 5/2015 | Bachler et al. |
| 2016/0081776 A1 | 3/2016 | Fäh et al. |

FOREIGN PATENT DOCUMENTS

| | | |
|---|---|---|
| WO | 2011/027229 A2 | 3/2011 |
| WO | 2014/137140 A1 | 9/2014 |

OTHER PUBLICATIONS

May 27, 2019 Written Opinion of the Searching Authority issued in International Patent Application No. PCT/EP2019/053527.
Jun. 21, 2021 Office Action issued in Chinese Patent Application 201980011825.4.
Nov. 3, 2021 Office Action issued in European Patent Application No. 19706432.2.
Apr. 4, 2025 Office Action issued in Canadian Patent Application No. 3,087,649.

DENTAL ANCHORING SYSTEM FOR FASTENING PROSTHESES

CROSS REFERENCE TO RELATED APPLICATIONS

This application is a divisional of U.S. application Ser. No. 16/969,721 filed Aug. 13, 2020, which in turn is a U.S. national stage application of PCT/EP2019/053527 filed Feb. 13, 2019, which claims the benefit of ES P201830128 filed Feb. 13, 2018, the contents of each of these applications being incorporated herein by reference.

DESCRIPTION

Object of the Invention

The present invention relates to a dental anchoring system for fastening prostheses which enables a self-adjustable fastening between the prosthesis and an implant, wherein the application of the dental anchoring system is for removable prostheses. The dental anchoring system is configured to enable a self-adjustable fastening of the prosthesis; and also to dampen the mobility of the prosthesis in a controlled manner, when it is subjected to a load during the use thereof by a patient.

Technical Problem to be Solved and Background of the Invention

Currently, dental prostheses are classified into two general groups: fixed prostheses and removable prostheses.

Fixed prostheses are immobilised by means of fastening screws or dental cement, such that in these cases the patient who possesses the fixed prosthesis cannot remove it by themselves, rather the prosthesis must be removed out by a dentist.

In contrast, removable prostheses are fastened by means of anchors which enable the patient to remove the prosthesis.

Fixed prostheses, although they have the advantage of looking more like natural teeth (which are not removable) have the large disadvantage of the patient not being able to clean well.

Moreover, although removable prostheses have the advantage of enabling perfect access for cleaning, it has the disadvantage of the patient feeling a certain sensation of mobility in the removable prosthesis.

The use of anchors in the area of supported implant dental prostheses, directed towards removable prostheses on implants has been very common the past few years, wherein said anchors are used to retain the prosthesis on the implant in a removable manner, meaning, with the possibility of being able to remove the dental prosthesis.

The implant is fastened to the bone of the patient by means of osteointegration; wherein the implant acts as an artificial support whereon a mechanism is fastened integrating the dental prosthesis that is to be inserted.

Common anchors are made up of three parts: a threaded male component, a female component and a retaining element with a certain mechanical elasticity.

In the current state of the art there are different types of anchors with several retaining structures, wherein the most common are as follows:
  Spherical structure comprising a metal anchor including a first ball-shaped male element and a second semi-spherical female element, made of Teflon or similar material.
  Cylindrical structure comprising a metal anchor including a first cylindrical male element and a second "saddle-type" cylindrical female element which mounts the cylindrical male element.
  Toroidal structure comprising a metal anchor including a first male element with a toroidal shape and a second female element with a toroidal shape, "locator type".

All the anchors are based on the mechanical elastic capacity of the retaining element. Plastic or metal materials are usually used, but always with an elastic capacity to change the geometry thereof and to be able to return back to the same. Furthermore, it is common to use geometries and designs which favour the elastic property of the retaining element. Anchors are also used with minimal thicknesses which favour the mentioned elastic property.

However, current anchors applied in the area of implant supported dental prostheses (the prosthesis is only fastened in implants) do not solve the large problem created with the removable prostheses, wherein the patient who carries the dental prosthesis has the sensation of mobility or the feeling of carrying a prosthesis that is not fixed.

Another problem with the current anchors is that they contribute little stability to the prosthesis and on occasion offer a lack of retention thereof, mainly due to a bad fit and therefore to wear and a loss of retention.

Moreover, the anchors applied in the area of implant-muco-supported dental prostheses, meaning, that prosthesis which is fastened not only in the implants but also in the gums has, apart from the low stability mentioned previously, a lack of resilience, a characteristic which defines the possibility of articulating the prosthesis on the implants, when faced with absorbing the maximum possible stresses to which it is subjected, which is translated into discomfort for the user and greater wear in the fastenings.

The present invention comes to solve these problems which are not solved in the current state of the art, meaning, achieving a removable prosthesis but with a concept or sensation of the fixed prosthesis.

DESCRIPTION OF THE INVENTION

With the aim of reaching the objectives and preventing the drawbacks mentioned in the previous sections, the invention proposes a dental anchoring system for fastening prostheses comprising a male component, a female component configured to be coupled to the male component, and a connection element configured to be coupled to the female component and which makes up the retaining element of the prosthesis that is configured to be joined to said connection element.

The female component comprises a base and a side wall with a closed outline which delimit an inner space wherein the male component is housed. Moreover, the connection element comprises a base and a side wall with a closed outline which delimit an inner space wherein at least one portion of the female component is housed.

The female component and the connection element are configured to enable a relative movement between them; wherein the female component is made of elastic material.

The female component and the connection element are configured to be coupled and be in contact with each other by means of a curved surface and a curved recess; wherein the curved surface forms part of an outer face of the side wall of the female component and the curved recess forms part of an inner face of the side wall of the connection element.

The anchoring system further comprises a clearance space delimited between an outer face of the base of the female component and an inner face of the base of the connection element.

The outer face of the side wall of the female component comprises a ring-shaped stop which is facing a ring-shaped plane located on the inner face of the side wall of the connection element; wherein between the ring-shaped plane and the ring-shaped stop there is an intermediate separating space; and wherein the mobility of the prosthesis is limited by the ring-shaped stop of the female component when at least one portion of the ring-shaped plane of the connection element comes into contact with the ring-shaped stop of the female component.

The female component includes a conduit with a closed outline which interrupts the continuity of the curved surface of said female component; wherein between a bottom of said conduit and an inner face of the side wall of the female component a ring-shaped narrowing is configured; and wherein the combination of the conduit and the ring-shaped narrowing provide mechanical elasticity to the female component, such that when the female component receives a vertical load during chewing and due to the pressure created in the contact points between the connection element and the female component, the female component performs a damping effect.

The base of the female component comprises a through slot which communicates with the inner space of said female component; wherein the conduit and the through slot improve the fit between the female component and the male component when the female component is subjected to a load. The conduit and the through slot provide mechanical elasticity during the load to be supported in the dental anchoring system; wherein the through slot is what enables the insertion of the female component into the connection element.

When the load is applied, the female component is deformed by the effects of the through slot and the conduit, fitting to the male component and the geometric shape thereof in an optimal manner.

The female component includes a mouth delimited by a ring-shaped rim comprising at least one radial groove which provides mechanical elasticity, as well as a greater duration against fatigue related to the number cycles assembling and disassembling the prosthesis including the anchoring system of the invention.

When the ring-shaped rim of the mouth of the female component includes several radial grooves, depending on the increase in number of said radial grooves, it increases the degree of mechanical elasticity of the joint between the male component and the assembly formed by the female component and the connection element.

In another embodiment of the system of the invention, the outer face of the base of the female component includes a protuberance which faces an opening located in the inner face of the base of the connection element. In this case, the dental anchoring system does not include the intermediate separating space. All of this is with the aim of preventing the mobility and resilience of the connection element, meaning, with the aim of maintaining said connection element fixed.

The embodiment described in the previous paragraph is applicable to a supported implant wherein the protuberance of the female component is inserted with clearance inside the opening of the connection element. In this case, the prosthesis must be stable in all the implants, behaving like a fixed prosthesis. In this embodiment, the anchoring system of the invention comprises a side clearance delimited between a side surface of the male component and an inner face of the side wall of the female component; wherein said side clearance is configured such that when the female component receives a vertical load during chewing and due to the pressure created in the contact points between the male component and the female component, the female component is deformed and fits to the side surface of the male component giving stability to the assembly of the male component and the female component.

The inner face of the side wall of the female component includes a ring-shaped opening which is configured to be in contact with a ring-shaped protuberance located on a side surface of the male component; wherein said ring-shaped protuberance makes up a retaining element of the female component when it is coupled on the male component.

The female component of the outer curved surface which is related to the inner curved recess of the connection element, such that when loaded during chewing, it enables a relative rotation or turning between the female component and the connection element.

In one embodiment of the invention, the outer curved surface of the female component comprises a spherical geometry and the curved recess of the connection element also comprises a spherical geometry.

The design of the anchoring system of the invention enables a joint combination of rotation, resilience (damping) and fit during chewing.

For the purpose of helping to make this specification more readily understandable, a set of drawings constituting an integral part of the same has been included below, wherein by way of illustration and not limitation the object of the invention has been represented.

DESCRIPTION OF AN EXEMPLARY EMBODIMENT OF THE INVENTION

Figure 1:
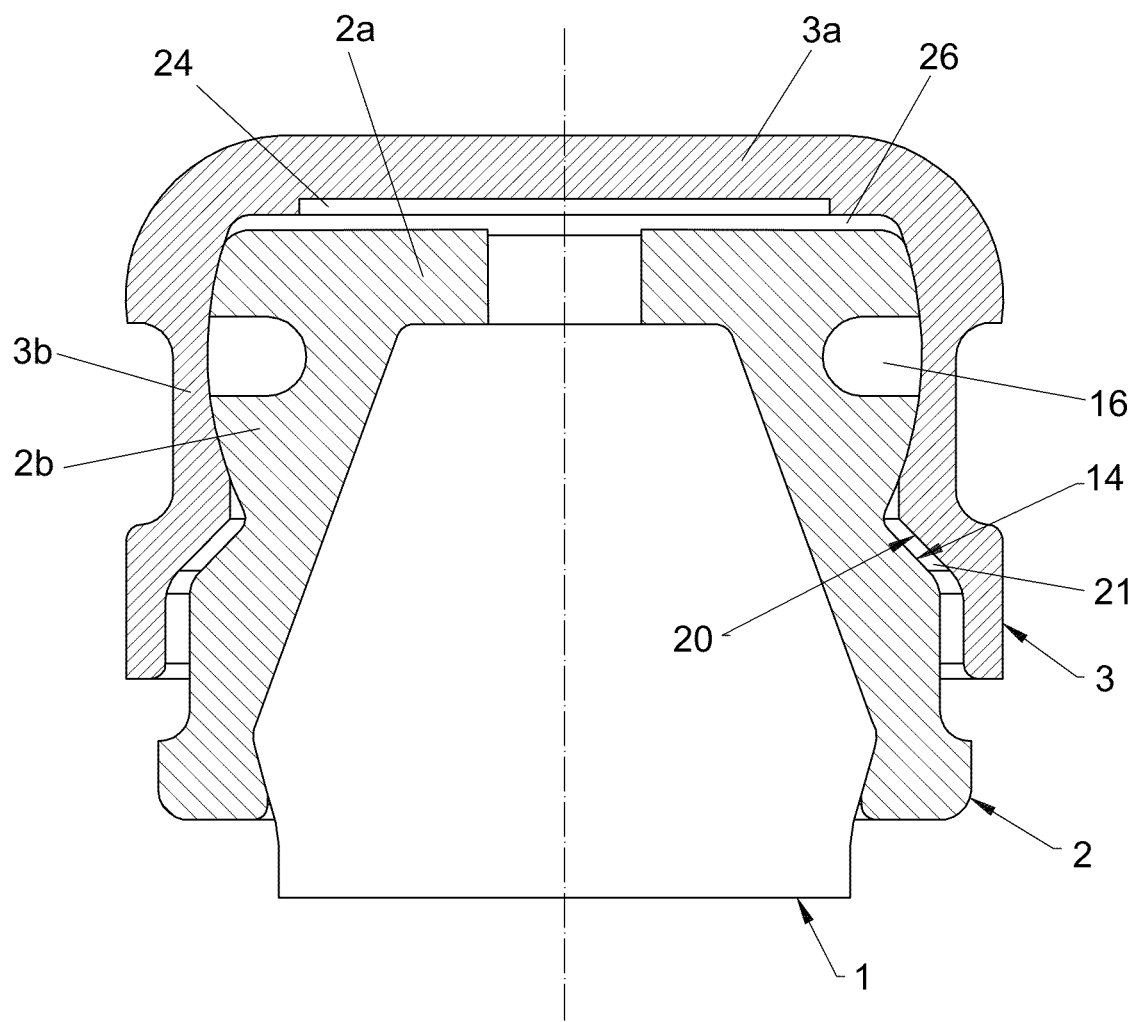
FIG. 1.—Shows a cross-sectional elevation view of the dental anchoring system for fastening the prosthesis, object of the invention. It is applicable for the case in which the anchoring system enables mobility or resilience. It refers to accompanying the resilience of the gum of a patient.

Considering the numbering adopted in the figures, the dental anchoring system for fastening prostheses comprises a male component 1, a female component 2 which is coupled to the male component 1, and a connection element 3 which makes up the retaining element of the prosthesis (not shown in the figures); wherein the connection element 3 is coupled on the female component 2 as described below.

The male component 1 is fastened jointly and severally to an implant not shown in the figures in a conventional manner. The female component 2 is the part, the configuration and design of which fundamentally provide the advantages to the anchoring system of the invention.

The female component 2 has an enclosing structure with a mouth delimited by a ring-shaped rim 10 including at least one radial groove 11 which provides an added mechanical elasticity to the female component 2 and in general to the dental anchoring system. Said radial groove 11 provides a greater duration against the fatigue of the female component 2 related to the number of cycles to assemble/disassemble the prosthesis in the mouth of a user.

The female component 2 comprises a base 2a and a side wall 2b; wherein the base 2a includes a through slot 4 which communicates with an internal hollow 5 of the female component 2, wherein the male component 1 is housed when the prosthesis is anchored to the male component 1 by means of the female component 2 and the connection element 3 of the anchoring system of the invention.

The female component 2 which is shown in the figures includes several radial grooves 11 which are arranged oriented in different directions with respect to the direction wherein the through slot 4 is located; all of this with the aim of not debilitating said female component 2.

It is worth noting that as the number of radial grooves 11 increases, the mechanical elasticity of the female component 2 increases, and as a consequence thereof the necessary force to assemble/disassemble the female component 2 on the male component 1 decreases.

The base 2a of the female component 2 includes an outer face 6 and an inner face 7, while the side wall 2b of the female component 2 includes an outer face 8 and an inner face 9; wherein the internal hollow 5 of the female component 2 is delimited by the inner face 7 thereof of the base 2a and by the inner face 9 of the side wall 2b.

Said internal hollow 5 of the female component 2 comprises a frustoconical configuration wherein the inner face 9 thereof includes a ring-shaped opening 9a which is complemented by a ring-shaped protuberance 12a located on a side surface 12 of the male component 1; wherein said ring-shaped protuberance 12a of the male component 1 fits into the ring-shaped opening 9a of the female component 2; and wherein said ring-shaped opening 9a is adjacent to the ring-shaped rim 10 of the female component 2.

With regard to what is said in the previous paragraph, the female component 2 is anchored to the male component 1 through the ring-shaped opening 9a of said female component 2 wherein the ring-shaped protuberance 12a of the male component 1 is housed; wherein the inner face 9 of the side wall 2b of the female component 2 is in contact with at least one portion of the side surface 12 of the male component 1; and the inner face 7 of the base 2a of the female component 2 is in contact with a surface 1a of the male component 1 which corresponds to the smaller base of the male component 1 which has a frustoconical configuration. It is worth noting that the ring-shaped protuberance 12a of the male component 1 is in contact with the ring-shaped opening 9a of the female component 2 when the female component 2 is mounted on the male component 1.

Figure 2:
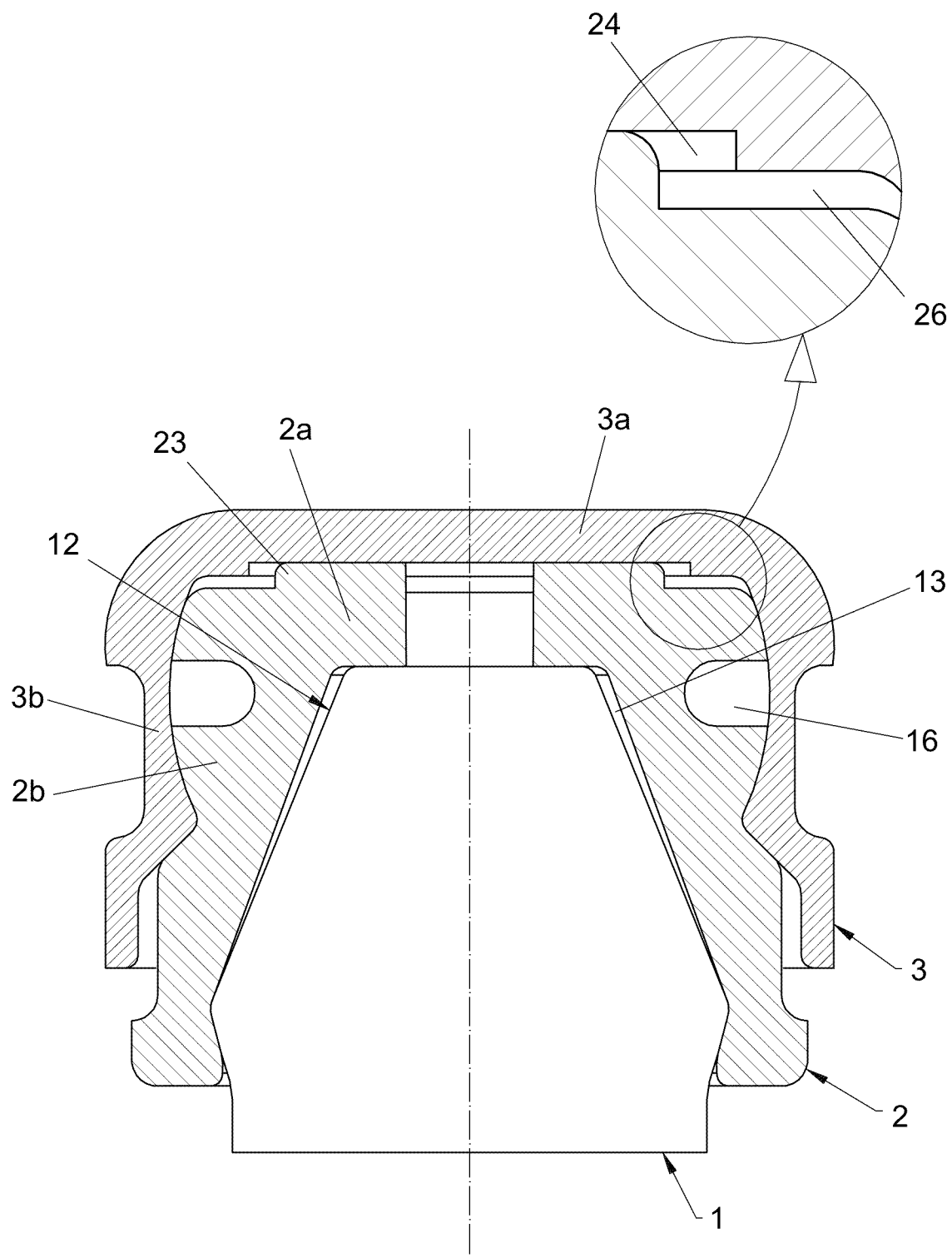
FIG. 2.—Shows a cross-sectional elevation view of the dental anchoring system which is applicable for supported implants for the case in which the anchoring system prevents mobility or resilience by seeking a fixed behaviour.

In one embodiment of the invention, like the one shown in FIG. 2, between the side surface 12 of the male component 1 and the inner face 9 of the side wall 2b of the female component 2, side clearance 13 is formed which is started in the contact area between the ring-shaped protuberance 12a of the male component 1 and the ring-shaped opening 9a of the female component 2, and ends in correspondence with the surface 1a of the smaller base of the male component 1, wherein said side clearance 13 has a larger size.

The outer face 8 of the side wall 2b of the female component 2 comprises a ring-shaped stop 14 and a curved surface 15 which is delimited between the plane forming the outer face 6 of the base 2a of the female component 2 and the ring-shaped stop 14 of the female component 2.

The female component 2 includes a conduit 16 with a closed outline which interrupts the continuity of the curved surface 15, such that between the bottom of said conduit 16 and the inner face 9 of the side wall 2b of the female component 2 a ring-shaped narrowing 17 is formed which together with the conduit 16 provides an added mechanical elasticity to the female component 2 and in general it provides an added mechanical elasticity to the assembly of the anchoring system of the invention.

The conduit 16 together with the through slot 4 also provides an added mechanical elasticity to the female component 2 and to the dental anchoring system, and they also improve the fit between the female component 2 and the male component 1, when the female component 2 is subjected to a load; wherein said added mechanical elasticity and the fit are further improved by means of the side clearance 13 existing between the male component 1 and the female component 2.

The through slot 4 and the conduit 16 of the female component 2 provide a mechanical elasticity to the dental anchoring system to support the load to which it is subjected, further facilitating the assembly and disassembly of the prosthesis including said dental anchoring system, such that when the load is supported, the female component 2 is deformed by the effects of the conduit 16 and through slot 4 thereof; thus achieving an optimal mode for fitting the female component 2 on the geometry of the male component 1.

The connection element 3 also has an enclosing structure delimiting an inner space 18, in a portion of which a portion of the female component 2 fits.

The connection element 3 comprises a base 3a and a side wall 3b delimited between an outer face 29 and an inner face 30, while the base 3a of the connection element 3 is delimited between an outer face 31 and an inner face 32.

The inner face 30 of the side wall 3b of the connection element 3 includes a ring-shaped plane 20 and a curved recess 19 which is complemented by the curved surface 15 of the female component 2; wherein said curved surface 15 is configured to fit into the curved recess 19 that is located in an area adjacent to the inner face 32 of the base 3a of the connection element 3.

Said ring-shaped plane 20 of the connection element 3 is facing the ring-shaped stop 14 of the female component 2; wherein between the ring-shaped plane 20 and the ring-shaped stop 14 there is an intermediate space 21 which enables a controlled mobility of the connection element 3 and in general of the prosthesis when the dental anchoring system is subjected to a load, such that the limitation of said mobility reaches until a portion of the ring-shaped plane 20 of the connection element 3 comes into contact with the ring-shaped stop 14 of the female component 2.

Moreover, between the outer face 6 of the base 2a of the female component 2 and the inner face 32 of the base 3a of the connection element 3, there is a clearance space 26.

The clearance space 26 referred to in the previous paragraph, together with the intermediate space 21 delimited between the ring-shaped plane 20 of the connection element 3 and the ring-shaped stop 14 of the female component 2, enable a controlled mobility of rotation 22 of the connection element 3 guided in the curved surface 15 of the female component 2; all of this to enable the prosthesis to rotate if necessary when the dental anchoring system is subjected to a load 25: or during the assembly/disassembly of the prosthesis, or during the use of the prosthesis carried by a user.

In the case of a supported implant, the prosthesis must be stable in all the implants, behaving like a fixed prosthesis. To do so, the female component 2 possesses, on the outer face 6 of the base 2a thereof, a protuberance 23 which is inserted with clearance in an opening 24 located in the inner face 32 of the base 3a of the connection element 3; all of this as shown in FIG. 2. The protuberance 23 of the female component is in contact with a bottom of the opening 24 of the connection element 3.

FIG. 1 shows an embodiment wherein the base 2a of the female component 2 lacks the protuberance 23 and the base 3a of the connection element 3 includes the opening 24.

Figure 3:
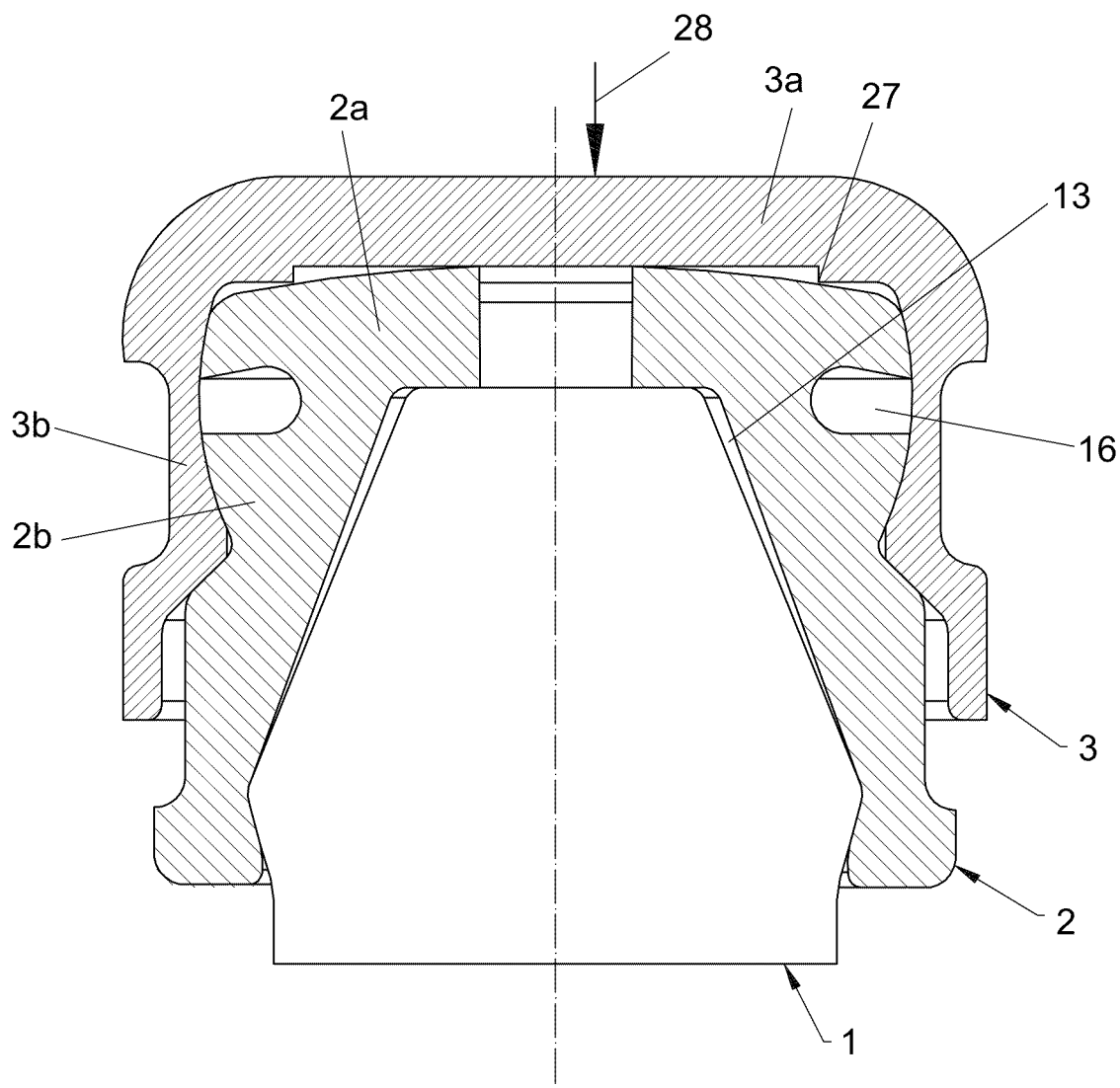
FIG. 3.—Shows another cross-sectional elevation view of the dental anchoring system subjected to a load.
Figure 4:
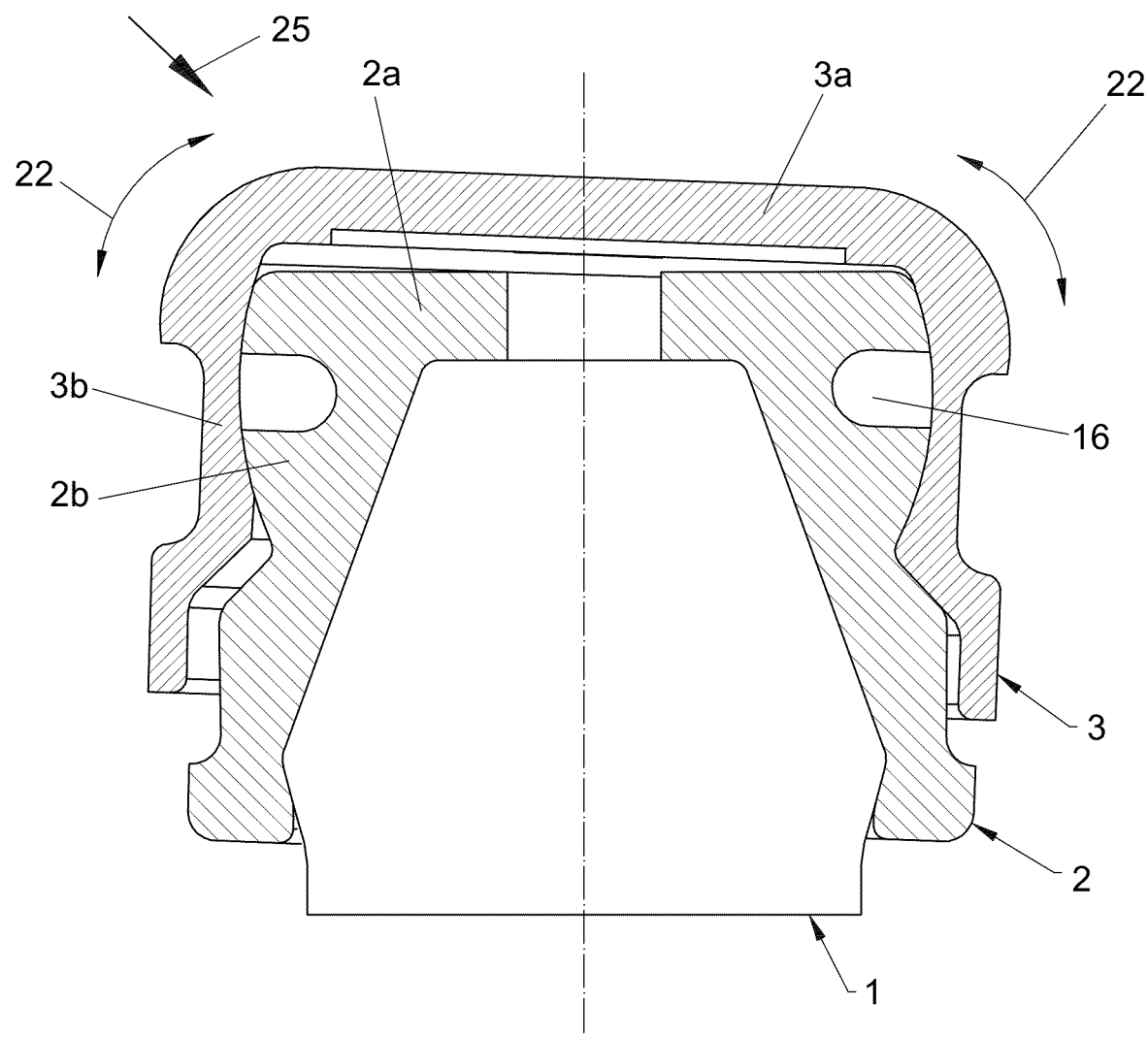
FIG. 4.—Shows a view of the dental anchoring system under a load tending to rotate said dental anchoring system.
Figure 5:
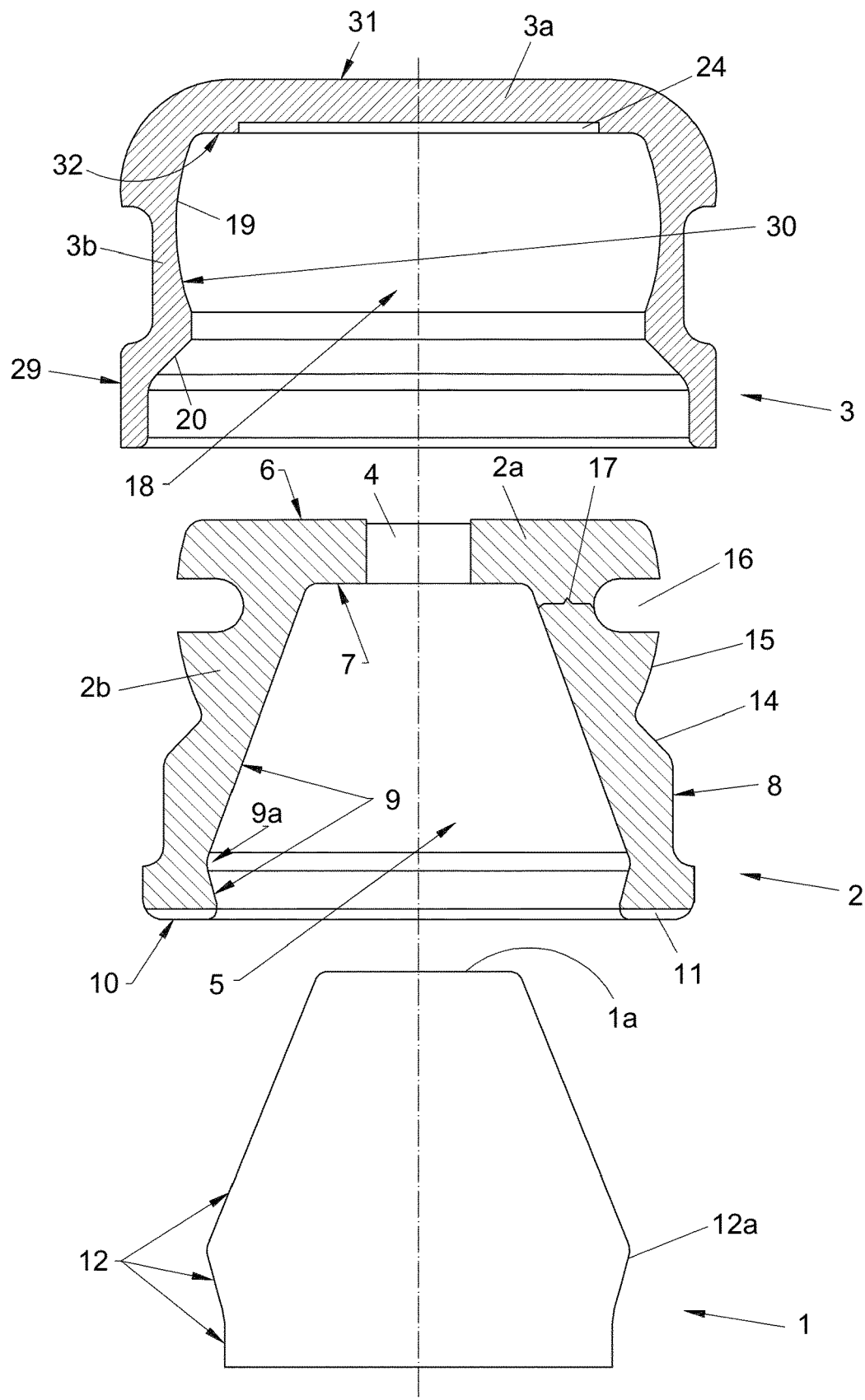
FIG. 5.—Shows an exploded view of the anchoring system of the invention.
Figure 6:
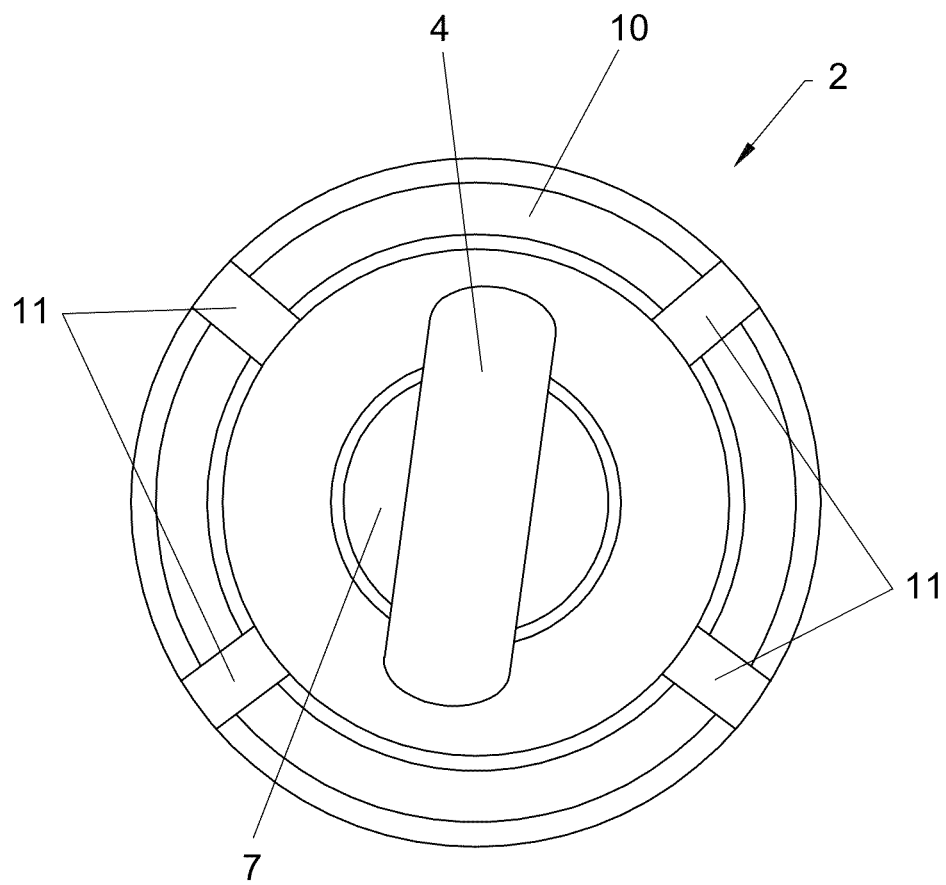
FIG. 6.—Shows a bottom plan view of a female component which forms part of the dental anchoring system of the invention.

Considering what is shown in FIG. 3, the outer face 6 of the base 2a of the female component 2 comprises a curved surface due to a load 28 to which it is subjected; wherein in this situation a portion of said curved surface is in contact at least with one central portion of the bottom of the opening 24 of the base 3a of the connection element 3 and is also in contact with an edge 27 which delimits the opening 24 of the base 3a of the connection element 3.

In the case of a retained and muco-supported implant prosthesis, meaning, the case wherein the prosthesis is fastened in implants and rests on the gums, said prosthesis has to possess a certain resilience.

Resilience is the capacity that the prosthesis possesses to dampen, in the vicinity of the implants, the stresses to which it is subjected, taking into account that the prosthesis is fastened in the implants and resting on the gums; meaning, without that resilience effect, the prosthesis would be fixed in the implants and would behave as if it were embedded (with the moments of force that this creates in the implants), developing into premature wear of the prosthesis due to the stresses to which it is subjected.

Thanks to the resilience, the linking of the prosthesis to the implants by means of the dental anchoring system of the invention behaves like a joint, which enables said moments of force to be removed, which is what provides a greater durability of the fastenings by means of the anchoring system of the invention.

The resilience is achieved by means of the clearance space existing between the base 2a of the female component 2 and the base 3a of the connection element 3; by means of the conduit 16 of the female component 2 and also by means of the side clearance 13 delimited between the male component 1 and the female component 2.

Thanks to these separations, a limited and controlled damping is achieved, given that if this damping was very high, the disadvantage could arise of the sensation of a movable prosthesis; such that said controlled damping is enough to provide the resilient effect for the prosthesis which enables the useful life thereof to be increased.

Therefore, the structure of the female component 2 provides the dental anchoring system of the invention with the simultaneous capacity of fit, rotation and resilience.

In practice, during the use of a fixed prosthesis by means of the anchoring system of the invention and also as it is assembled and disassembled, the connection element 3 receives the load through said prosthesis; in a first case, the load 28 is applied perpendicularly on the base 3a of the connection element 3 like the one shown in FIG. 3; and in a second case, the load 25 has an orientation in another direction, such that in this second case at least the prosthesis together with the connection element 3 have a combined mobility tending to make the connection element 3 rotate.

It is worth noting that when the anchoring system includes the side clearance 13 delimited between the male component 1 and the female component 2, if the connection element 3 receives a load through the prosthesis, then the female component 2 is also mobilised until one portion of the inner face 9 thereof abuts against a portion of the side surface 12 of the male component 1.

The invention claimed is:

1. A dental anchoring system for fastening a prostheses, comprising:
    a male component;
    a female component configured to be coupled to the male component; and
    a connection element, configured to be coupled to the female component, which makes up a retaining element of the prosthesis which is configured to be joined to the connection element,
    wherein the female component comprises a base and a side wall which delimit an inner space wherein the male component is housed,
    wherein the connection element comprises a base and a side wall which delimit an inner space wherein at least one portion of the female component is housed,
    wherein the female component is made of elastic material,
    wherein the female component and the connection element are configured to move relative to each other and dampen a stress to a vicinity of the female component and the connection element when a load is applied to the anchoring system,
    wherein the female component and the connection element are configured to be coupled and be in contact with each other by means of a curved surface and a curved recess in a vertical cross sectional view,
    wherein the curved surface forms part of an outer face of the side wall of the female component and the curved recess forms part of an inner face of the side wall of the connection element,
    wherein the anchoring system further comprises a clearance space delimited between an outer face of the base of the female component and an inner face of the base of the connection element,
    wherein the female component includes a conduit which interrupts the continuity of the curved surface of said female component; and between a bottom of said conduit and an inner side face of the female component a ring-shaped narrowing is configured,
    wherein the combination of the conduit and ring-shaped narrowing provides mechanical elasticity to the female component,
    wherein the base of the female component comprises a through slot which communicates with the inner space of said female component,
    wherein the outer face of the side wall of the female component comprises a ring-shaped stop which is facing a ring-shaped plane located on the inner face of the side wall of the connection element, and
    wherein the female component possesses on the outer face of the base thereof a protuberance facing a hole located in the inner face of the base of the connection element.

* * * * *